US 9,059,787 B1

(12) United States Patent
Griniasty

(10) Patent No.: US 9,059,787 B1
(45) Date of Patent: Jun. 16, 2015

(54) ESTIMATING TRANSMISSION POWER AND NOISE LEVEL OF RECEIVED SIGNAL IN A CDMA RECEIVER

(71) Applicant: Marvell International Ltd., Hamilton (BM)

(72) Inventor: Meir Griniasty, Kfar Saba (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/302,444

(22) Filed: Jun. 12, 2014

Related U.S. Application Data

(60) Provisional application No. 61/834,252, filed on Jun. 12, 2013.

(51) Int. Cl.
*H04B 1/00* (2006.01)
*H04B 1/7113* (2011.01)

(52) U.S. Cl.
CPC .................................... *H04B 1/7113* (2013.01)

(58) Field of Classification Search
USPC ......... 375/147, 149, 148, 150, 152, 130, 316, 375/346
See application file for complete search history.

(56) References Cited

U.S. PATENT DOCUMENTS

| 6,434,366 | B1* | 8/2002 | Harrison et al. ................. 455/69 |
| 6,643,520 | B1* | 11/2003 | Park et al. ...................... 455/522 |
| 7,218,617 | B1* | 5/2007 | Usuda et al. ................... 370/320 |
| 8,909,153 | B2* | 12/2014 | Burke et al. .................. 455/41.2 |
| 2005/0105593 | A1* | 5/2005 | Dateki et al. .................... 375/130 |
| 2010/0303141 | A1* | 12/2010 | Yeo et al. ....................... 375/227 |

OTHER PUBLICATIONS

3GPP TS 25.211, "3rd Generation Partnership Project;Technical Specification Group Radio Access Network;Physical channels and mapping of transport channels onto physical channels (FDD)", Release 11, version 11.4.0, 63 pages, Jun. 2013.

* cited by examiner

*Primary Examiner* — Siu Lee

(57) ABSTRACT

A method in a communication terminal includes receiving a CDMA signal that was transmitted over a communication channel by a base station at a given transmission power, and received at the communication terminal with noise of a given noise level. The CDMA signal includes at least a pilot channel that was spread using a pilot spreading sequence. The received CDMA signal is de-spread with the pilot spreading sequence, and a pilot amplitude of the pilot channel is calculated based on the de-spread CDMA signal. Based on the received CDMA signal and the pilot amplitude, the transmission power of the base station and the noise level of the noise are estimated.

18 Claims, 3 Drawing Sheets

ESTIMATING TRANSMISSION POWER AND NOISE LEVEL OF RECEIVED SIGNAL IN A CDMA RECEIVER

CROSS-REFERENCE TO RELATED APPLICATIONS

This application claims the benefit of U.S. Provisional Patent Application 61/834,252, filed Jun. 12, 2013, whose disclosure is incorporated herein by reference.

FIELD OF THE DISCLOSURE

The present disclosure relates generally to communication systems, and particularly to methods and systems for estimating the transmission power and the noise level of a received signal in a CDMA receiver.

BACKGROUND

In various Code-Division Multiple Access (CDMA) communication systems, a pilot channel serves for performing channel measurements and for synchronizing between the receiver and the transmitter. Various configurations of CDMA channels are defined, for example, in "3$^{rd}$ Generation Partnership Project; Technical Specification Group Radio Access Network; Physical channels and mapping of transport channels onto physical channels (FDD); (Release 11)," TS 25.211, version 11.4.0, June, 2013, which is incorporated herein by reference.

The description above is presented as a general overview of related art in this field and should not be construed as an admission that any of the information it contains constitutes prior art against the present patent application.

SUMMARY

An embodiment that is described herein provides a method including receiving in a communication terminal a CDMA signal that was transmitted over a communication channel by a base station at a given transmission power, and received at the communication terminal with noise of a given noise level. The CDMA signal includes at least a pilot channel that was spread using a pilot spreading sequence. The received CDMA signal is de-spread with the pilot spreading sequence, and a pilot amplitude of the pilot channel is calculated based on the de-spread CDMA signal. Based on the received CDMA signal and the pilot amplitude, the transmission power of the base station and the noise level of the noise are estimated.

In an embodiment, the CDMA signal has been spread at a chip rate, and the method includes equalizing the received CDMA signal at the chip rate based on the estimated transmission power and the estimated noise level. In another embodiment, de-spreading the received CDMA signal includes deriving multiple Interference-and-Noise (IAN) components, each corresponding to a de-spreading of a respective different segment of the received CDMA signal with the pilot spreading sequence.

In some embodiments, calculating the pilot amplitude includes calculating statistical attributes of the IAN components. In some embodiments, calculating the statistical attributes includes calculating mean and variance values of the IAN components. In other embodiments, calculating the statistical attributes includes deriving differences among multiple pairs of the IAN components, and calculating the statistical attributes using the derived differences.

In an embodiment, estimating the transmission power and the noise level includes estimating one or more channel taps of a channel response of the communication channel and normalizing the channel response by the pilot amplitude, by dividing the channel taps by the pilot amplitude. In another embodiment, estimating the noise level includes estimating a signal power of the received CDMA signal and subtracting the transmission power from the signal power. In yet another embodiment, estimating the transmission power includes calculating a norm value of the channel taps by summing square absolute values of the channel taps. In yet further another embodiment, estimating the transmission power and the noise level are independent of a spectral distribution of the noise.

There is additionally provided, in accordance with an embodiment that is described herein, apparatus including a receiver front end and processing circuitry. The receiver is configured to receive a CDMA signal that was transmitted over a communication channel by a base station at a given transmission power and received at the communication terminal with noise of a given noise level. The CDMA signal includes at least a pilot channel that was spread using a pilot spreading sequence. The processing circuitry is configured to de-spread the received CDMA signal with the pilot spreading sequence, to calculate a pilot amplitude of the pilot channel based on the de-spread CDMA signal, and to estimate, based on the received CDMA signal and the pilot amplitude, the transmission power of the base station and the noise level of the noise.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
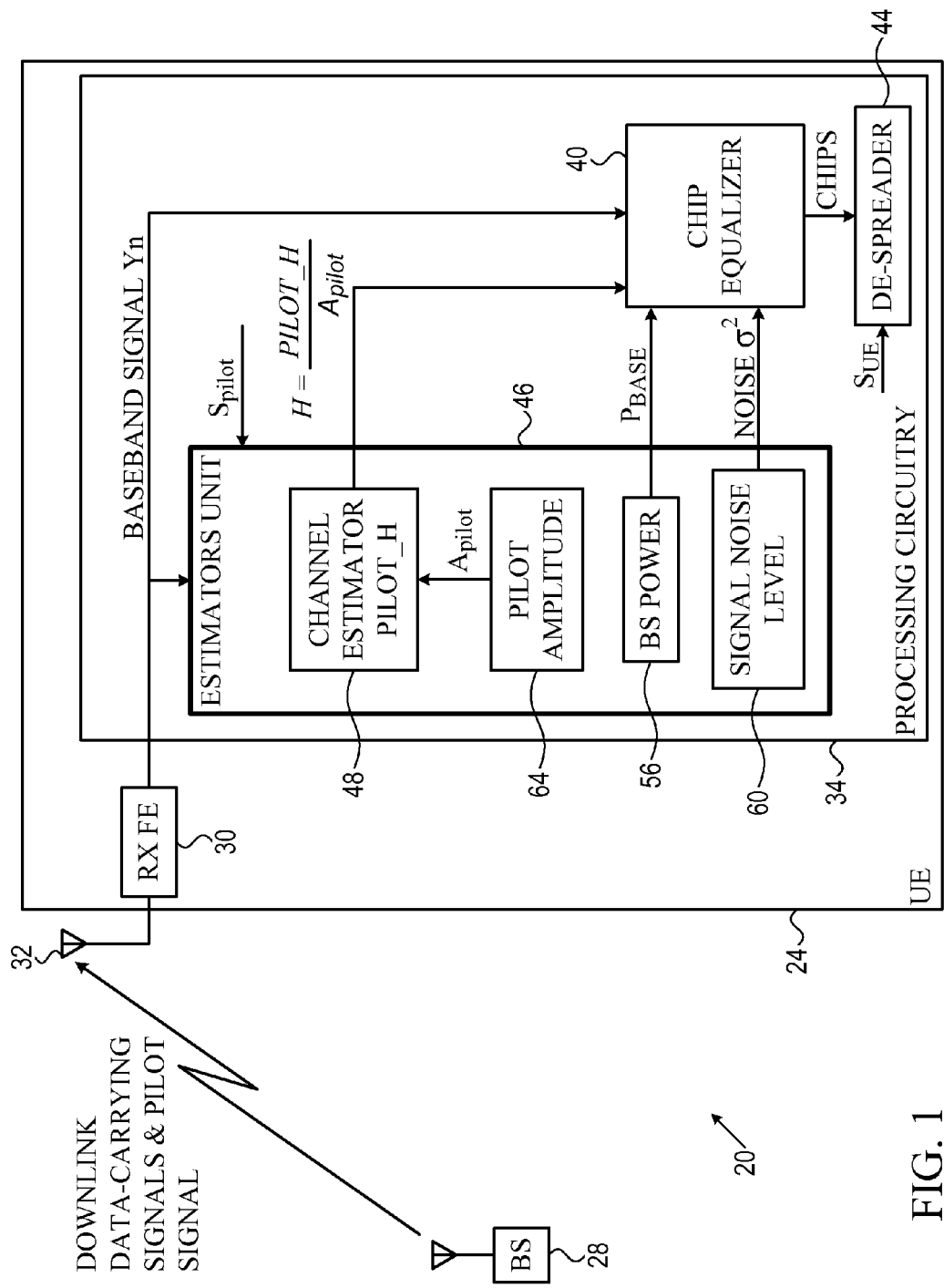
FIG. 1 is a block diagram that schematically illustrates a mobile communication terminal operating in a wireless Code-Division Multiple Access (CDMA) communication network, in accordance with an embodiment that is described herein.

Embodiments that are described herein provide improved methods and systems for estimating Base Station (BS) transmission power and noise level of a received signal in a Code-Division Multiple Access (CDMA) receiver. The estimations in the disclosed techniques are based on processing a CDMA carrier that comprises a pilot channel. Although the embodiments described herein refer mainly to reception and processing of Wideband CDMA (WCDMA) carriers, the disclosed techniques can be used with various other types of CDMA carriers. In the present context, for the sake of brevity, the term "CDMA" broadly includes WCDMA, CDMA2000, as well as any other form of CDMA.

In some embodiments, a receiver receives a CDMA carrier that carries at least a pilot channel, for example a pilot channel and one or more data and/or control channels. In some of the embodiments described herein, the receiver operates in a High-Speed Downlink Packet Access (HSDPA) mode, the data channel comprises a High-Speed Downlink Shared channel (HS-DSCH) that carries downlink data, and the pilot channel comprises a Primary Common Pilot Channel (P-CPICH) that is normally used by CDMA User Equipment (UE) for synchronizing with the base station and for performing channel measurements. The HS-DSCH typically also carries a High Speed-Shared Control Channel (HS-SCCH). The disclosed techniques, however, are applicable to other configurations and modes and to other types of channels, as well.

In the description that follows we generally refer to a carrier that comprises a pilot channel and one or more data channels. The disclosed techniques, however, are also applicable to a carrier that, instead of or in addition to the data channels, comprises one or more suitable control channels.

In various forms of CDMA communication, the network typically assigns unique spreading sequences to different transmitted channels. The spreading sequences are typically defined at a common chip rate that is higher than the symbol rate of the channels. Additionally, the transmitter side assigns to the different channels respective amplitudes that are unknown to the receiver.

A CDMA receiver typically comprises a front end unit that converts the received RF signal into a baseband signal, and a channel estimator for estimating the response of the communication channel between that transmitter and the receiver. The estimated channel response typically comprises one or more channel taps that correspond, for example, to multipath reception.

In some embodiments, estimating the channel response involves de-spreading the baseband signal using the pilot spreading sequence, wherein de-spreading with different shift alignments correspond to the different channel taps. Since, however, the amplitude that the transmitter has assigned to the pilot channel is unknown at the receiver, the multiplicative gain of the estimated channel response is unknown. Therefore, in an embodiment, the estimated channel response is typically normalized by an estimation of the pilot channel amplitude to recover the actual channel response.

In some embodiments, the receiver segments the baseband signal with alignment to periods of the pilot spreading sequence. In an embodiment, assuming that the pilot sequence carries all one-valued symbols, de-spreading the baseband signal in each segment using the pilot spreading sequence results in a per segment complex valued component denoted $M_i$. $M_i$ can be decomposed into an interference component $I_i$ that is generated by the channel taps (not including the line of sight tap), and a noise component $N_i$, wherein the interference and noise components are uncorrelated.

In some embodiments, the receiver estimates the pilot channel amplitude from a statistical attribute of $M_i$, from which an Interference-and-Noise (IAN) value is derived. In one embodiment, the receiver derives the IAN value from the variance of $M_i$. In another embodiment, IAN is derived from differences of $M_i$ components that belong to different segments.

The power $<Y \cdot Y^*>$ of the baseband signal can be decomposed to transmission power and received noise power $P_{BASE}$ and $P_{NOISE}$, respectively, i.e., $<Y \cdot Y^*>=P_{BASE}+P_{NOISE}$, wherein the operator $<\cdot>$ denotes an expected or average value. In an embodiment, the transmission power is estimated from the normalized taps $H_p$ of the channel response, i.e., $P_{BASE}=\Sigma_p |H_p|^2$. The noise power is thus given by $P_{NOISE}=<Y \cdot Y^*>-\Sigma_p |H_p|^2$.

The disclosed techniques thus enable the receiver to estimate the actual channel response using the pilot channel without any assumption regarding the spectral distribution of channel noise. The receiver normalizes the channel response by an estimated version of the pilot channel amplitude. The receiver uses the normalized channel response to estimate the transmission power and the noise level of the received signal, which in turn improve the accuracy of chip equalization in the receiver.

FIG. 1 is a block diagram that schematically illustrates a mobile communication terminal 24 operating in a wireless CDMA communication network 20, in accordance with an embodiment that is described herein. In WCDMA, LTE and LTE-A, terminal 24 is also referred to as UE, and the two terms are used interchangeably herein.

The receiver section of terminal 24 comprises one or more receive antennas 32 for receiving downlink signals from a Base Station (BS) 28. Depending on the applicable standard, BS 28 is also referred to as a cell, NodeB or eNodeB. In the present example, the downlink signal comprises a WCDMA carrier that carries multiple WCDMA channels—typically a pilot P-CPICH and one or more HS-DSCH data channels.

The pilot channel (e.g., P-CPICH) comprises pilot symbols that are known in advance to the receiver and are used, for example, for synchronization of the UE to the base station and for performing channel measurements by the UE. The HS-DSCH carries user data symbols that are typically unknown at the receiver. In alternative embodiments, any other suitable CDMA carrier that includes a known pilot signal and possibly one or more unknown data channels can also be used.

Although the embodiments described herein refer mainly to P-CPICH and HS-DSCH, the disclosed techniques can be used with any other suitable type of pilot channel and data channel, respectively. In the context of the present patent application and in the claims, the term "pilot channel" refers to a channel on which a base station transmits symbols or other waveforms that are known in advance to the UEs, e.g., for enabling the UEs to synchronize to the base station and/or perform parameter measurements. The term "data channel" refers to a channel that carries user data, and possibly other data, between the base station and a UE. A pilot channel, by contrast, carries known pilot symbols but does not carry user data.

Although in the configuration of FIG. 1 the elements of UE 24 are mainly described with respect to WCDMA, similar configurations are also applicable to terminals that operate in other suitable CDMA networks.

A Receiver Front End (RX FE) 30 down-converts the received signals from Radio Frequency (RF) to baseband and typically applies other functions such as filtering, amplification, gain control and digitization. The digitized baseband signals are provided to processing circuitry 34. In the example of FIG. 1, RX FE outputs a baseband signal $Y_n$ whose sample rate is referred to as a chip rate. FIG. 1 shows only the elements of circuitry 34 that are relevant to the disclosed estimation techniques, for the sake of clarity. The operations performed by the various elements of circuitry 34 are addressed in greater detail further below.

A chip equalizer 40 processes the baseband signal $Y_n$ so as to cancel out the distortion that the communication channel between the BS and the UE may have caused to the downlink CDMA carrier. For example, in an urban environment, the downlink signal that is received at the UE may comprise a multipath signal created by reflections of the signal transmitted from the BS by one or more buildings or other obstacles, with or without a direct reception path. A De-spreader 44 receives a chip sequence of undistorted chips from chip equalizer 40, and applies de-spreading using a unique spreading sequence-$S_{UE}$, which the network assigns to the UE.

In some embodiments, the CDAM carrier comprises at least a pilot channel whose spreading sequence $S_{pilot}$ and transmitted symbols are known at the receiver in advance. Processing circuitry 34 comprises a pilot-based estimators unit 46, which receives the baseband signal $Y_n$ and the pilot spreading sequence $S_{pilot}$, and estimates several parameters to be used by chip equalizer 40, as will be described in detail in FIGS. 2 and 3 below.

A channel estimator 48 estimates the impulse response PILOT_H of the communication channel between the BS and the UE. In some embodiments, channel estimator 48 performs channel estimation using spectral analysis methods. For example, channel estimator 48 separates, in an embodiment, between the spectral components of the signal and noise, assuming that the noise is white, i.e., the noise spectral components are mutually uncorrelated. This, however, may result in poor channel estimation, since the channel noise is typically colored rather than white.

In an embodiment, channel estimator 48 calculates correlations between the pilot spreading sequence $S_{pilot}$ and multiple shifted versions of the baseband signal $Y_n$, to find the coefficients of the channel impulse response PILOT_H. Since, however, the CDMA carrier typically comprises multiple channels (including the pilot channel) whose relative amplitudes are unknown to the receiver, the gain of the channel response estimation PILOT_H is also unknown. Estimating the channel response up to an unknown gain factor limits the ability of chip equalizer 40 to fully cancel out the distortion the channel creates and to later extract the transmitted symbols correctly.

Figure 2:
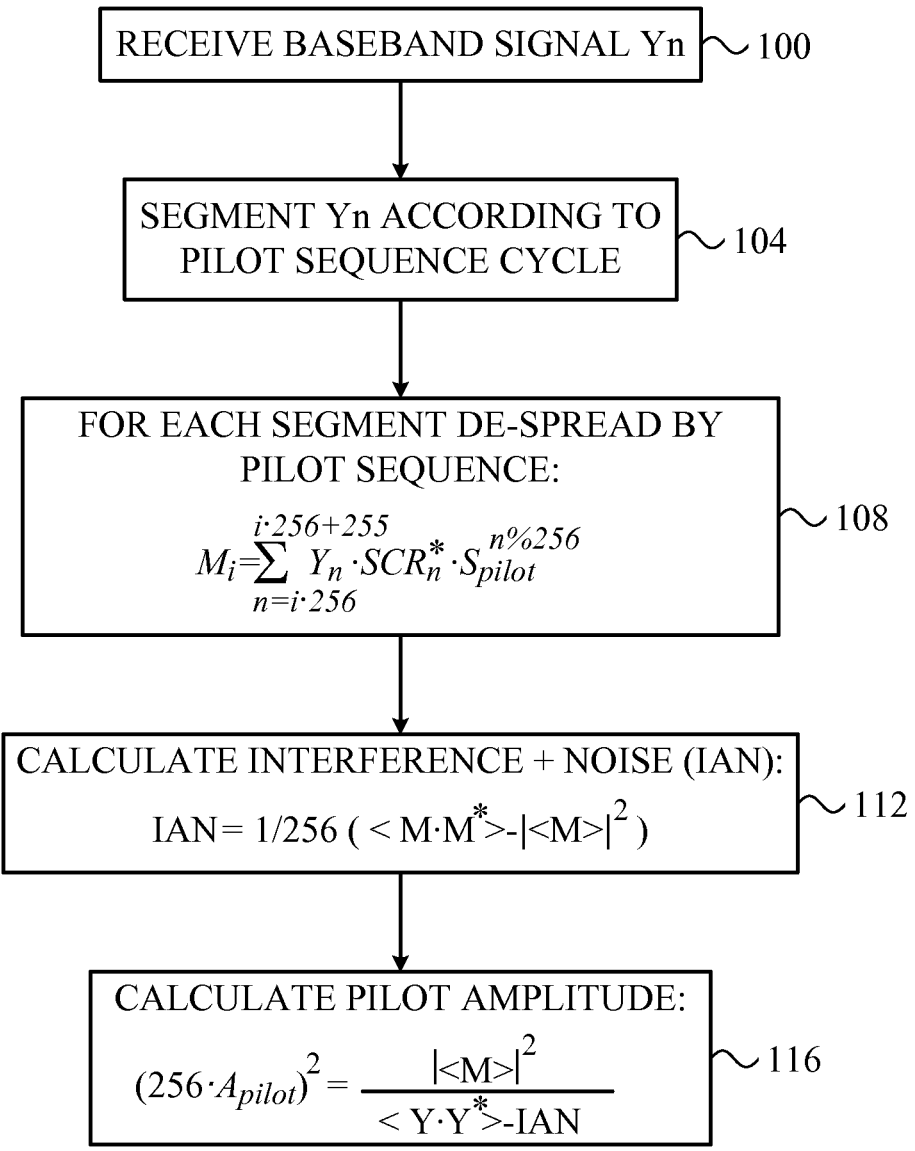
FIG. 2 is a flow chart that schematically illustrates a method for estimating the amplitude of a pilot channel, in accordance with an embodiment that is described herein.
Figure 3:
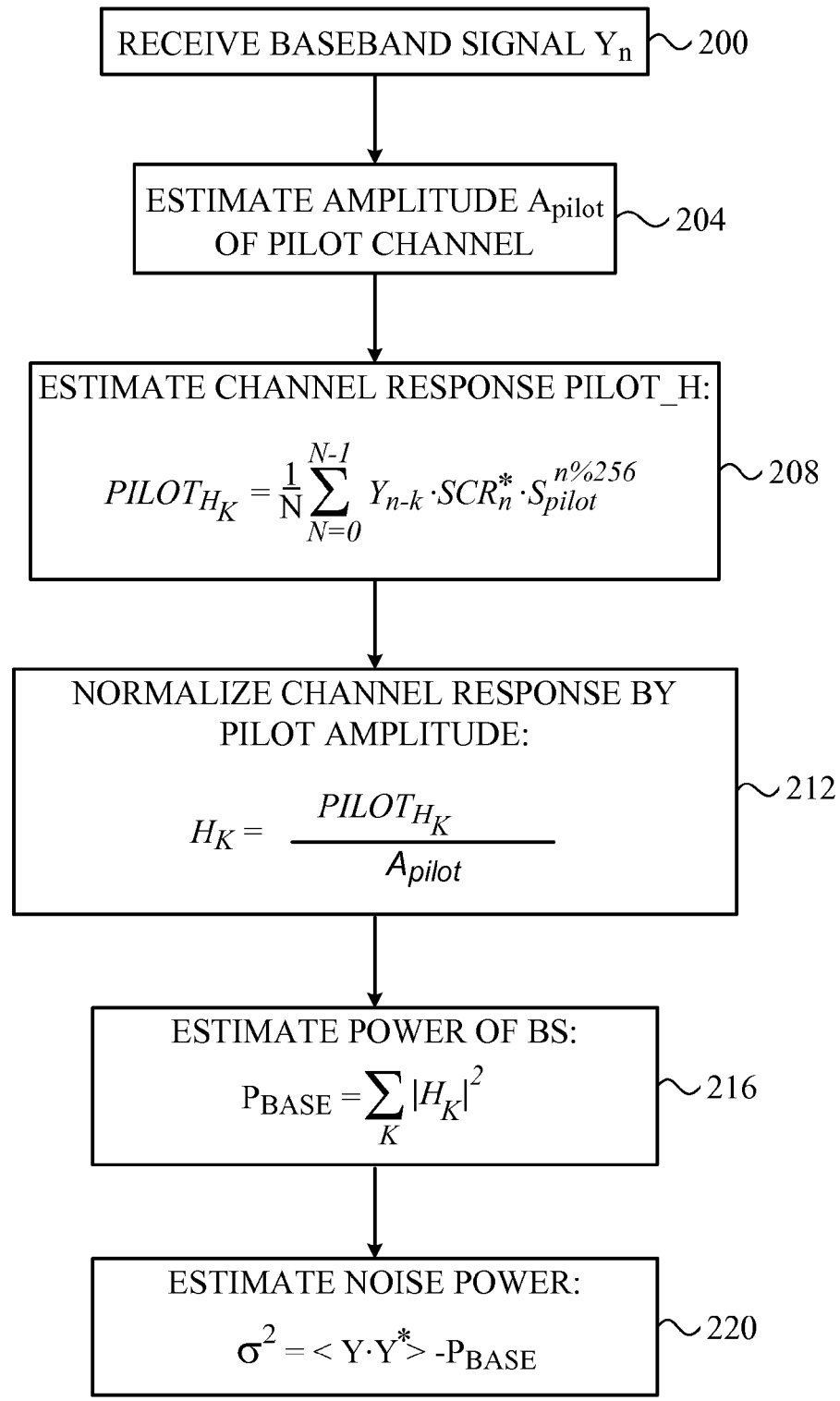
FIG. 3 is a flow chart that schematically illustrates a method for estimating the Base Station (BS) transmission power and the noise level of a received signal, in accordance with an embodiment that is described herein.

Estimators unit 46 comprises a BS transmitted power estimator 56, a received signal noise level estimator 60 and a pilot channel amplitude estimator 64. The various estimations carried out by estimators unit 46 serve as inputs to chip equalizer 40. Channel estimator 48 outputs a gain-normalized channel response H, which equals PILOT_H divided by the pilot channel amplitude estimation Apilot of pilot channel amplitude estimator 64. FIGS. 2 and 3 below describe example embodiments of the estimators of unit 46.

In some embodiments, some or all of the elements of UE 24 are implemented in hardware, such as using one or more Radio Frequency Integrated Circuits (RFICs), Field-Programmable Gate Arrays (FPGAs) or Application-Specific Integrated Circuits (ASICs). In some embodiments, some or all of the elements of UE 24 are implemented in a chip set.

In an alternative embodiment, certain UE elements, such as certain elements of processing circuitry 34, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The UE and processing circuitry configurations seen in FIG. 1 are example configurations, which are depicted solely for the sake of clarity. In alternative embodiments, any other suitable UE and processing circuitry configurations can be used. UE and processing circuitry elements that are not mandatory for understanding of the disclosed techniques have been omitted from the figure for the sake of clarity.

FIG. 2 is a flow chart that schematically illustrates a method for estimating the amplitude $A_{pilot}$ of a pilot channel, in accordance with an embodiment that is described herein. In some embodiments, the estimated amplitude of the pilot channel is used as a gain normalization factor for the channel response estimation.

The method begins at a receiving operation 100, with pilot amplitude estimator 64 receiving the baseband signal $Y_n$ from RX FE 30. As explained above, the received signal typically is distorted by the communication channel whose impulse response is denoted H, and by noise η that is not necessarily white. In the present example, the baseband signal is depicted in Equation 1:

$$Y_n = \sum_{p=-P}^{P} H_p C_{n-p} + \eta_n \qquad \text{Equation 1}$$

In Equation 1, $C_{n-p}$ denotes the chip sequence $C_n$ shifted by chip units, $H=\{H_{-P}, \ldots, H_0, \ldots, H_P\}$ denote 2P+1 channel taps, having complex values, of the channel response H. The sequence of noise samples is denoted $\eta_n$, and the noise level is given by $\sigma=<\eta_n \cdot \eta_n^*>$, wherein the operator $<x>$ denotes the statistical expectance or average value of the random variable x. The expected value of the random x can be estimated from a sequence $x_n$ of N samples of the random variable, by calculating $N \cdot <x> = \sum_{n=0}^{N-1} x_n$.

The chip sequence in Equation 1 above comprises spread sequences of the pilot channel and possibly of one or more data channels. Each of the pilot and data channels is spread using a unique spreading sequence $S_{cd}$, which is indexed by a respective integer denoted cd. $S_{cd}$ is a periodic spreading sequence whose period length is denoted $L_{cd}$. In the description that follows we assume that cd=0 indexes the pilot spreading sequence, and that the total number of spreading sequences is Ncd.

Each channel (cd) carries a respective sequence of symbols $SMB_{cd}$ that are spread using the unique spreading sequence $S_{cd}$. In addition, the channels are scrambled using a common scrambling sequence $SCR_m$. Equation 2 depicts an example chip sequence as generated at the BS.

$$C_m = \sum_{cd=0}^{Ncd-1} A_{cd} \cdot S_{cd}^{m \% Lcd} \cdot SCR_m \cdot SMB_{cd}^{m/Lcd} \qquad \text{Equation 2}$$

The BS assigns to each channel cd a respective real valued amplitude $A_{cd}$ such that the amplitudes of all the channels sum up to unity. The pilot channel amplitude (i.e., of index cd=0) is referred to as $A_{pilot}$.

$$\sum_{cd=0}^{Ncd-1} A_{cd} = 1 \qquad \text{Equation 3}$$

Note that Equations 2 and 3 above imply that the expected value of the absolute square value of the chip sequence equals unity, i.e., $<|C_m|^2>=1$.

At a segmentation operation 104, pilot amplitude estimator 64 segments the baseband signal $Y_n$ into segments that are time aligned to the period of the pilot spreading sequence. At a pilot de-spreading operation 108, pilot amplitude estimator 64 applies both de-scrambling using the common scrambling sequence $SCR_m$ and de-spreading using the pilot spreading sequence $S_{pilot}$ to calculate a complex valued result $M_i$ per segment i, as given in Equation 4. As will be described below, certain statistical attributes of $M_i$ comprise interference and noise components. Therefore, $M_i$ are also referred to as temporal Interference-and-Noise (IAN) components.

$$M_i = \sum_{n=i \cdot 256}^{i \cdot 256+255} Y_n \cdot SCR_n^* \cdot S_{pilot}^{n\%256} \quad \text{Equation 4}$$

In Equation 4, the length of the pilot spreading sequence equals 256, as defined, for example, in the 3GPP specifications TS 25.211 cited above. Alternatively, the pilot sequence period may comprise any other suitable length other than 256. We can further expand Equation 4 by incorporating $Y_n$ from Equation 1 and $C_n$ from Equation 2 above to express $M_i$ as the sum of constant, interference and noise parts:

$$M_i = 256 \cdot A_{pilot} \cdot H_0 + I_i + N_i \quad \text{Equation 5:}$$

The constant part in Equation 5 equals $256 \cdot A_{pilot} \cdot H_0$, and the interference and noise components $I_i$ and $N_i$ are given in Equations 6 and 7 respectively.

$$I_i = \sum_{p, p \neq 0} H_p \sum_{n=i \cdot 256}^{i \cdot 256+255} C_{n-p} \cdot SCR_n^* \cdot S_{pilot}^{n\%256} \quad \text{Equation 6}$$

$$N_i = \sum_{n=i \cdot 256}^{i \cdot 256+255} \eta_n \cdot SCR_n^* \cdot S_{pilot}^{n\%256} \quad \text{Equation 7}$$

We now derive an expression for the variance of $M_i$ and show that this variance comprises interference and noise components. Since the chip sequence $C_n$ and the noise samples $\eta_n$ in Equations 5-7 are uncorrelated, $<|M_i|^2>$ can be written as:

$$<|M_i|^2> = (256 \cdot A_{pilot})^2 \cdot |H0|^2 + <|I_i|^2> + <|N_i|^2> \quad \text{Equation 8:}$$

Additionally, $|<M_i>|^2$ is given in Equation 9.

$$|<M_i>|^2 = (256 \cdot A_{pilot})^2 \cdot |H_0|^2 \quad \text{Equation 9:}$$

The variance of $M_i$ is therefore given by:

$$VAR(M_i) = <|M_i|^2> - |<M_i>|^2 = <|I_i|^2> + <|N_i|^2> \quad \text{Equation 10:}$$

Equation 10 implies that $VAR(M_i)$ comprises interference and noise components that are given by:

$$\langle |I_i|^2 \rangle = 256 \cdot \sum_{p, p \neq 0} |H_p|^2 \quad \text{Equation 11}$$

$$<|N_i|^2> = 256 \cdot \sigma^2 \quad \text{Equation 12:}$$

At an interference and noise estimation operation 112, pilot amplitude estimator 64 calculates an interference-and-noise (IAN) result that is derived from $VAR(M_i)$. Incorporating Equations 11-12 into Equation 10 above, we get:

$$IAN = \frac{1}{256} \cdot VAR(M_i) = \sum_{p, p \neq 0} |H_p|^2 + \sigma^2 \quad \text{Equation 13}$$

In Equation 14 below, we show how the baseband signal of Equation 1 is related to the IAN of Equation 13.

$$\langle |Y_n|^2 \rangle = \sum_{p, p \neq 0} |H_p|^2 + \sigma^2 = |H_0|^2 + IAN \quad \text{Equation 14}$$

Therefore, at operation 116 the pilot amplitude is estimated using the result of equation 14, and the method terminates.

$$(256 \cdot A_{pilot})^2 = \frac{|\langle M_i \rangle|^2}{\langle |Y_n|^2 \rangle - IAN} \quad \text{Equation 15}$$

To summarize, to calculate Equation 15, $M_i$ is calculated at operation 108 using Equation 4, IAN is derived at operation 112 from $VAR(M_i)$, and $<|y_n|^2>$ is derived from the baseband signal.

In an alternative embodiment, IAN in Equation 13 is calculated based on absolute $M_i$ differences, of which the expected value can be decomposed as follows:

$$\langle |M_i - M_{j \neq i}|^2 \rangle = \langle |I_i|^2 + |N_i|^2 \rangle = 512 \cdot \sum_{p, p \neq 0} |H_p|^2 + 512 \cdot \sigma^2 \quad \text{Equation 16}$$

In this embodiment IAN is derived from the $M_i$ differences using Equation 16. The $M_i$ pairs for calculating the differences in Equation 16 can be selected in any suitable method. In one embodiment, the differences are calculated between pairs of adjacent IAN components.

$$IAN = \frac{1}{512} \langle |M_i - M_{j \neq i}|^2 \rangle = \sum_{p, p \neq 0} |H_p|^2 + \sigma^2 \quad \text{Equation 17}$$

FIG. 3 is a flow chart that schematically illustrates a method for estimating the BS transmission power and the noise level of the received signal, in accordance with an embodiment that is described herein. The method begins at a reception operation 200, in which estimators unit 46 receives the baseband signal $Y_n$ from RX FE 30. At a pilot amplitude estimation operation 204, pilot amplitude estimator unit 64 estimates the pilot channel amplitude $A_{pilot}$, for example, using the method of FIG. 2 above, or using any other suitable method.

At a channel estimation operation 208, channel estimator 48 estimates the channel response PILOT_H. Channel estimator 48 receives the baseband signal $Y_n$, and produces 2P+1 components (i.e., estimated channel taps) PILOT_$H_K$, K=−P . . . P, of the channel response.

$$PILOT\_H_K = \frac{1}{N} \sum_{n=0}^{N-1} Y_{n-k} \cdot SCR_n^* \cdot S_{pilot}^{n\%256} \quad \text{Equation 18}$$

As explained above, the gain of channel estimation PILOT_H is unknown. As a result, to derive the true channel response H, PILOT_H should be factored with a respective gain compensation factor. At a gain compensation operation 212 channel estimator 48 normalizes PILOT_H by the pilot channel amplitude $A_{pilot}$ that was found in operation 204 above.

At a base power estimation operation 216, base power estimator 56 uses Equation 19 below to calculate the power of the BS as follows:

$$\hat{P}_{BASE} = \sum_{p, p \neq 0} |H_p|^2 \qquad \text{Equation 19}$$

wherein Hp are the normalized components of PILOT_H/$A_{pilot}$ from operation 212 above.

Returning now to Equation 1 above, the received signal $Y_n$ comprises a component that includes the chip sequence $C_n$ and a noise component $\eta_n$ that is contributed by the communication channel. Since the samples of the chip sequence and the noise are uncorrelated, and using the abovementioned fact that $<|C_m|^2>=1$, the expanded expression for $<Y_n \cdot Y_n^*>$ can be decomposed into the BS transmission power P_BASE and the noise level as in Equation 20:

$$\langle Y_n \cdot Y_n^* \rangle = \langle |Y_n|^2 \rangle = \sum_{p, p \neq 0} |H_p|^2 + \sigma^2 = P_{BASE} + P_{NOISE} \qquad \text{Equation 20}$$

At a noise power estimation operation 220, noise level estimator 60 uses Equation 20 and $\hat{P}_{BASE}$ from Equation 19 as follows:

$$\widehat{\sigma^2} = <|Y_n|^2> - \hat{P}_{BASE} \qquad \text{Equation 21:}$$

Following operation 220 the method terminates.

As explained above, $\hat{P}_{BASE}$, $\hat{\sigma}^2$, and the gain compensated channel response estimation H, are used by chip equalizer 40.

Although the embodiments described herein mainly address improved estimation methods in a UE operating in a WCDMA network, the methods and systems described herein can also be used in other applications, such as in any suitable receiver that receives a CDMA pilot signal having known symbols.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a communication terminal, receiving a Code-Division Multiple Access (CDMA) signal that was transmitted over a communication channel by a base station at a given transmission power and received at the communication terminal with noise of a given noise level, wherein the CDMA signal comprises at least a pilot channel that was spread using a pilot spreading sequence;
   de-spreading the received CDMA signal with the pilot spreading sequence, and calculating a pilot amplitude of the pilot channel based on the de-spread CDMA signal; and
   estimating, based on the received CDMA signal and the pilot amplitude, the transmission power of the base station and the noise level of the noise, by estimating one or more channel taps of a channel response of the communication channel, and normalizing the channel response by the pilot amplitude by dividing the channel taps by the pilot amplitude.

2. The method according to claim 1, wherein the CDMA signal has been spread at a chip rate, and comprising equalizing the received CDMA signal at the chip rate based on the estimated transmission power and the estimated noise level.

3. The method according to claim 1, wherein estimating the noise level comprises estimating a signal power of the received CDMA signal and subtracting the transmission power from the signal power.

4. The method according to claim 1, wherein estimating the transmission power comprises calculating a norm value of the channel taps by summing square absolute values of the channel taps.

5. The method according claim 1, wherein estimating the transmission power and the noise level are independent of a spectral distribution of the noise.

6. A method, comprising:
   in a communication terminal, receiving a Code-Division Multiple Access (CDMA) signal that was transmitted over a communication channel by a base station at a given transmission power and received at the communication terminal with noise of a given noise level, wherein the CDMA signal comprises at least a pilot channel that was spread using a pilot spreading sequence;
   de-spreading the received CDMA signal with the pilot spreading sequence by deriving multiple Interference-and-Noise (IAN) components, each corresponding to a de-spreading of a respective different segment of the received CDMA signal with the pilot spreading sequence;
   calculating a pilot amplitude of the pilot channel by calculating statistical attributes of the IAN components; and
   estimating, based on the received CDMA signal and the pilot amplitude, the transmission power of the base station and the noise level of the noise.

7. The method according to claim 6, wherein calculating the statistical attributes comprises calculating mean and variance values of the IAN components.

8. The method according to claim 6, wherein calculating the statistical attributes comprises deriving differences among multiple pairs of the IAN components, and calculating the statistical attributes using the derived differences.

9. Apparatus, comprising:
   a receiver, which is configured to receive a Code-Division Multiple Access (CDMA) signal that was transmitted over a communication channel by a base station at a given transmission power and received at a communication terminal with noise of a given noise level, wherein the CDMA signal comprises at least a pilot channel that was spread using a pilot spreading sequence; and
   processing circuitry, which is configured to de-spread the received CDMA signal with the pilot spreading sequence, to calculate a pilot amplitude of the pilot channel based on the de-spread CDMA signal, and to estimate, based on the received CDMA signal and the pilot amplitude, the transmission power of the base station and the noise level of the noise, by estimating one or more channel taps of a channel response of the communication channel, and normalizing the channel response by the pilot amplitude by dividing the channel taps by the pilot amplitude.

10. The apparatus according to claim 9, wherein the CDMA signal has been spread at a chip rate, and wherein the processing circuitry is configured to equalize the received CDMA signal at the chip rate based on the estimated transmission power and the estimated noise level.

11. The apparatus according claim 9, wherein the processing circuitry is configured to estimate the transmission power and the noise level are independent of a spectral distribution of the noise.

12. A mobile communication terminal comprising the apparatus of claim 9.

13. A chipset for processing signals in a mobile communication terminal, comprising the apparatus of claim 9.

14. Apparatus, comprising:
a receiver, which is configured to receive a Code-Division Multiple Access (CDMA) signal that was transmitted over a communication channel by a base station at a given transmission power and received at a communication terminal with noise of a given noise level, wherein the CDMA signal comprises at least a pilot channel that was spread using a pilot spreading sequence; and
processing circuitry, which is configured to de-spread the received CDMA signal with the pilot spreading sequence by deriving multiple Interference-and-Noise (IAN) components, each corresponding to a de-spreading of a respective different segment of the received CDMA signal with the pilot spreading sequence, to calculate a pilot amplitude of the pilot channel by calculating statistical attributes of the IAN components, and to estimate, based on the received CDMA signal and the pilot amplitude, the transmission power of the base station and the noise level of the noise.

15. The apparatus according to claim 14, wherein the processing circuitry is configured to calculate mean and variance values of the IAN components.

16. The apparatus according to claim 14, wherein the processing circuitry is configured to derive differences among multiple pairs of the IAN components, and to calculate the statistical attributes using the derived differences.

17. The apparatus according to claim 14, wherein the processing circuitry is configured to estimate the noise level by estimating a signal power of the received CDMA signal and subtracting the transmission power from the signal power.

18. The apparatus according to claim 14, wherein the processing circuitry is configured to estimate the transmission power by calculating a norm value of channel taps by summing square absolute values of the channel taps.

* * * * *